United States Patent [19]

Bastide et al.

[11] Patent Number: 5,268,947
[45] Date of Patent: Dec. 7, 1993

[54] NUCLEAR FUEL ELEMENTS COMPRISING A TRAP FOR FISSION PRODUCTS BASED ON OXIDE

[75] Inventors: Bernard Bastide, La Buisse; Bertrand Morel, Moirans; Michel Allibert, Grenoble, all of France

[73] Assignee: Uranium Pechiney, Courbevoie, France

[21] Appl. No.: 962,735

[22] Filed: Oct. 19, 1992

[30] Foreign Application Priority Data

Oct. 31, 1991 [FR] France .................. 91 13713

[51] Int. Cl.$^5$ .............................................. G21C 3/00
[52] U.S. Cl. ............................ 376/422; 376/418; 976/DIG. 53; 976/DIG. 51; 252/638
[58] Field of Search ............... 376/414, 417, 418, 415, 376/422; 976/DIG. 53, DIG. 51, 638; 252/629, 630, 631

[56] References Cited

U.S. PATENT DOCUMENTS

| | | | |
|---|---|---|---|
| 3,784,384 | 1/1974 | Webb | 106/39 |
| 3,826,754 | 7/1974 | Grossman et al. | 252/301.1 R |
| 3,849,330 | 11/1974 | Isaacson et al. | 252/301.1 W |
| 4,006,096 | 2/1977 | Forthmann et al. | 252/301.1 S |
| 4,020,004 | 4/1977 | Schulz et al. | 252/301.1 W |
| 4,257,847 | 3/1981 | Gibby et al. | 376/418 |
| 4,297,246 | 10/1981 | Cairns et al. | 252/465 |
| 4,314,909 | 2/1982 | Beall et al. | 252/629 |
| 4,541,984 | 9/1985 | Palmer | 376/415 |
| 4,683,114 | 7/1981 | Ho et al. | 376/419 |
| 5,091,120 | 2/1992 | Feugier et al. | 264/0.5 |

Primary Examiner—Donald P. Walsh
Assistant Examiner—Meena Chelliah
Attorney, Agent, or Firm—Dennison, Meserole, Pollack & Scheiner

[57] ABSTRACT

A nuclear fuel element comprising sintered pellets based on uraniferous oxide which are surrounded by a metallic sheath and permitting trapping of the fission products which appear in the course of irradiation characterized in that the pellets contain or are coated with or that the sheath is internally coated with an agent for trapping said fission products based on mixed metallic oxide comprising $SiO_2$ and one at least of the oxides $ZrO_2$ or $CeO_2$.

13 Claims, No Drawings

NUCLEAR FUEL ELEMENTS COMPRISING A TRAP FOR FISSION PRODUCTS BASED ON OXIDE

TECHNICAL FIELD

The present invention concerns nuclear fuel elements based on sintered uraniferous oxide or mixed oxide and comprising a trap or captor for fission products based on metallic oxygenated compounds.

Such a trapping agent is in particular adapted to long-life fission products such as Cs, Sr . . . which are generated in the course of irradiation in a nuclear reactor.

STATE OF THE ART

Reactors of the PWR, BWR or fast neutron type which use fuel pellets based on sintered oxide $UO_2$ or mixed oxides generate 'in situ' fission products of which some are not specifically gaseous in the core of the reactor. In normal operation those solid fission products remain generally in place in the pellets although in regard to some thereof migration phenomena may occur, which are due to the temperature differences between the core and the periphery of a pellet, towards the outside of the pellet. Even in that case however the major part thereof remains confined in the fuel pellets.

The fission products appear in the pellets in elementary form and may form compounds, which are relatively stable at the temperature of the core of the reactor (300° to 900° C.), with the fuel oxides which form the pellets.

However, in the case of a major accident which causes an excessive rise in temperature in the core of the reactor, followed by damage to or even fusion or melt-down of the core, such compounds are then insufficiently stable and the fission products are then liberated, with a serious risk of dissemination into and contamination of the environment; that risk is more especially severe as such fission products have long lives (some tens of years). That is the case for example with Cs 137 or Sr 90.

An arrangement which makes it possible to trap caesium in normal operation in a fast neutron reactor has been proposed in patent FR 2438319 (Westinghouse); it comprises interposing between the fissile and fertile fuel pellets Cs captors which are formed by pellets of low density and particular shape and which consist of $TiO_2$ or $Nb_2O_5$. Those oxides fix Cs at the usual temperature in the core of the reactor and the shape of the pellets makes it possible to avoid any stress, due to swelling which occurs in the course of normal operation of the reactor, on the sheathing of the fuel element. In that arrangement, it appears that the caesium has to reach the pellets of captors in order to be trapped and that only Cs which has migrated to a sufficient degree is actually trapped.

In the event of a major accident moreover such an arrangement would be found to be insufficiently effective to prevent all dissemination of the Cs; in fact, all the free Cs which has not yet been trapped but which is present in the fuel pellets could escape from the sheathing and contaminate the environment, as the trapping speed is not fast enough.

Patent FR 2142030 describes agents for trapping fission products (Cs, Rb, $I_2$, Te), based on metallic oxide such as $SiO_2$, $TiO_2$, and mixtures thereof, but also Al silicates, titanates of the metals of groups II, III and IV or $SiO_2$ and CaO, said agents being incorporated in the fuel as additives at a concentration which is generally between 0.5 and 4% or better between 0.5 and 2%.

Although those agents fix the fission products as soon as they appear in the course of irradiation, giving compounds for example of the Cs silico-aluminate or silico-titanate type, of a stability which is often acceptable, in contrast, the kinetics of decomposition of the compound comprising the fission product are sometimes too high and retention of the fission products is insufficient, for example in a major accident situation which involves an abnormal rise in temperature which is generally aggravated by the presence of a reducing atmosphere.

That is why the applicants sought a way of trapping the most dangerous fission products, as far as possible as soon as they appear in the course of irradiation, in particular in the mass of the fuel pellets.

In particular however the applicants sought to provide a trap of enhanced stability and effectiveness so that the fission products are not removed at elevated temperatures which can attain or exceed 1600° C. or better at very high temperatures of more than 1800° C., and indeed in the event of core fusion or melt-down, irrespective of the type of atmosphere present.

The applicants also sought to provide a trap which does not involve fusion or premature incipient fusion of the fuel pellets in a major accident situation, in other words a trap which does not perform a fusion function in relation to the pellets which will thus retain sufficient refractoriness.

DESCRIPTION OF THE INVENTION

The invention concerns a nuclear fuel element capable of trapping the fission products which appear in the course of irradiation, giving a compound with the fission products which is stable at more 1600° C., said fuel element, comprising pellets of sintered uraniferous oxide which are surrounded by a metal sheath, is characterised in that said pellets contain an agent for trapping said fission products based on mixed metallic oxide comprising $SiO_2$ and one at least of the following oxides: $ZrO_2$ or $CeO_2$.

A second variant of the invention comprises coating the pellets of sintered oxide with said trapping agent.

A third variant consists of internally coating the sheath with said trapping agent.

The three embodiments may be combined to improve the results; however it is preferably to use at least the first.

The sintered pellets to which the invention relates are generally contained in a metallic sheath to form a fuel stick or rod and are suitable for all types of reactor using ceramic fuel materials. They contain at least $UO_2$, possibly with the addition of other fuel materials such as $PuO_2$ (mixed fuels), $ThO_2$ or other elements which make it possible to act on the structure (for example density, grain size . . . ) of the pellet in the sintering operation or concerning the neutron aspect (for example presence of a neutrophage agent for example).

The fission products are trapped in the form of a chemical compound with the trapping agent, the compound being formed in situ in the course of irradiation.

The trapping agents used are generally a mixture, or preferably a constituted compound, of two at least of the following oxides: $Al_2O_3$, $CeO_2$, $Nb_2O_5$, $SiO_2$, $TiO_2$, $UO_{2+x}$, $V_2O_3$, $Y_2O_3$ and $ZrO_2$ and preferably $Al_2O_3$, $Nb_2O_5$, $SiO_2$, $TiO_2$, $UO_{2+x}$ and $ZrO_2$.

The trapping agent which can be a simple mixture of its constituents or a compound which is already constituted must have the following properties: it must be non-volatile and inert in regard to sintering of the fuel pellets, it must have a small capture section and give a stable and non-volatile compound with the fission product to be trapped, and the kinetics of decomposition of the stable compound must be as low as possible at elevated temperatures of 1600° C. or better higher than 1800° C., irrespective of the atmosphere.

However, preferably with pairs of oxides of metals such as Al/Si (silico-aluminate) or Al/Ti (titano-aluminate), the applicants found that the trapping agents comprising $SiO_2$ and one at least of the oxides $ZrO_2$ and $CeO_2$ gave compounds with the fission products having very slow decomposition kinetics under the above-indicated conditions.

In order to provide for better retention of the fission product, it is advantageous for the trapping agent to be introduced into the fuel element in an amount such that the compound formed is in a substoichiometric relationship when the fuel element reaches the end of its life, that is to say when the maximum amount of fission product has been generated.

For example in the case of silico-zirconate, the Cs generated/Zr molar ratio is advantageously lower than 1 so that a compound is formed whose formula would be $CsZrSi_3O_{8.5}$ in place of the compound indexed as $Cs_2ZrSi_3O_9$.

Such a characteristic is particularly attractive to permit the trapping agent to perform an effective function until the fuel element has reached its maximum degree of combustion.

For trapping agents based on $SiO_2$ and $ZrO_2$, it is also advantageous for the Si/Zr molar ratio to be between 2 and 3 in order to enhance retention of the fission product at high temperature.

To achieve that ratio, it is possible for the trapping agent used to be a mixture of $SiO_2$ and $ZrO_2$ but preferably a mixture of the compound $ZrSiO_4$ and $SiO_2$ so as to avoid a possible interaction between $ZrO_2$ and the nuclear fuel.

To illustrate the invention, a compound of a trapping agent with a non-radioactive fission product (Cs) was formed, and its stability was tested.

Thus, using alumina crucibles, caesium carbonate was added to an intimate mixture of two oxides $ZrO_2+SiO_2$, and also to an intimate mixture of the crushed compound $ZrSiO_4+SiO_2$, in both those cases the Si/Zr molar ratio being between 2 and 3 and the granulometry being very fine, and to the crushed compound $ZrSiO_4$. In all cases, the Cs/Zr molar ratio was lower than 1.

By way of comparison, crucibles were also prepared, containing caesium carbonate and a single oxide ($Al_2O_3$, $SiO_2$, $ZrO_2$, $TiO_2$, $Nb_2O_5$, ZnO, $CeO_2$ and $Y_2O_3$).

The crucibles were raised to 630° C. in dry air for several hours to cause decomposition of the carbonate, which results in $CO_2$ being given off, the caesium oxide being melted and a compound with the trapping agent being produced. The mixture was then homogenised, the crucible was closed by means of a cover and the whole was raised to a temperature of 750° C. for a period of 3 days. The product was then homogenised and then raised to 900° C. (for 5 hours), 1200° C. (for 5 hours) and 1600° C. (for more than 5 hours). Whereas in the case of the simple oxides ($Al_2O_3$, $SiO_2$, $ZrO_2$, $TiO_2$, $Nb_2O_5$, ZnO, $CeO_2$ and $Y_2O_3$), only traces of caesium are found after 1600° C., it appeared that, with the mixtures of oxides, $ZrSiO_4+SiO_2$ and with $ZrSiO_4$, the retention of Cs is between 80 and 87%, whether the atmosphere is oxidising (air) or reducing ($N_2+H_2$).

Moreover, at 2000° C. in a neutral atmosphere, the same silico-zirconates according to the invention retain more than 40% of the trapped Cs whereas under the same conditions a silico-aluminate (of the type $CsAlSiO_4$ or $CsAlSi_2O_6$, pollucite) releases more than 80% thereof.

Another comparative test was carried out: a trapping agent of the titano-aluminate type, giving for example with Cs a compound of the type $CsAlTiO_4$, loses about 80% of its Cs at temperatures of higher than 1600° C., and as moreover the Ti capture section is slightly penalising, it is scarcely possible to increase the amount thereof in order to trap more Cs.

Another comparative test showed that, with compounds of the Cs silico-aluminate type, for example $CsAlSiO_4$, at a temperature of about 1600° C., the rate of removal of Cs was very high since, after 1 hour in a reducing atmosphere, the loss of Cs was 70%, and it should be noted that that type of atmosphere is that which involves the greatest risk of being formed in a major accident situation.

The trapping agent may be ternary or better quaternary.

Thus, it may be an attractive proposition to add $TiO_2$ to the trapping agent; the $TiO_2$ does in fact facilitate trapping of the fission products (for example Cs) by improving crystallisation of the compound formed and therefore its stability. The same applies in regard to $Nb_2O_5$.

For example, the substitution of a part (10–20%) of $ZrO_2$ by $TiO_2$ in the case of the trapping agents of silico-zirconate type results in compounds (Cs—Zr—Ti—Si—O) which involve better crystallisation at lower temperature and consequently a better retention action; thus, after being maintained at 1600° C., that provides a Cs/Zr molar ratio which is generally at least 0.9. On the other hand, the substitution of a large part and even the whole of $ZrO_2$ by $TiO_2$ results in caesium silico-titanate compounds which melt at very low temperature (lower than 1200° C.) and which do not exhibit sufficient retention of caesium at temperatures of higher than 1600° C.

To promote the trapping action by virtue of a dilution effect, it may also be an attractive proposition to add to the trapping agent at least one stable oxygenated compound which is preferably alkali metal (for example $Rb_2O$, $Na_2O$, $K_2O$) or alkaline-earth metal (or similar) (for example CaO, BaO, SrO, MgO).

The alkali (or alkaline-earth) compound added is generally different from the fission product to be trapped. For example, it is possible to dope the trapping agent of the silico-zirconate type by adding Rb in the form of a rubidium silico-zirconate. That trapping agent will react with the caesium to form a compound Cs—Rb—Cr—Si—O which will be quasi isomorphous of the compound which it is sought to obtain upon trapping of Cs by means for example of a trapping agent containing solely a silico-zirconate: the systems of compounds containing Rb and Cs being of similar structures, it will be seen that Cs which is generated when fusion occurs will exchange without difficulty with Rb which is initially present in the system.

The addition of an alkaline compound has two advantages:

i. that makes it possible to choose a trapping agent having a particular structure which will be close to that which it will form 'in situ' upon trapping of the fission product (Cs or Sr).

Thus, it is ensured that the final compound containing the trapped fission product will be formed, with its particular structure, close to that of the doped trapping agent, while minimising the dimensional stresses which may appear within the fuel and improving the final level of stability.

ii. in the case where the molar ratio of caesium to other alkaline compound, which is obtained after trapping, remains low (for example less than 0.2), the chemical activity of the caesium approaches that of the other alkaline compound and that results in a higher level of stability, caesium being in fact more volatile than the other alkali metals.

To illustrate those phenomena, a trapping agent $RbZrSi_3O_{8.5}$ was mixed in equimolar amounts with oxide or chloride of Cs. After those mixtures had been raised to 700° C. for a period of 200 hours in order to fix the caesium, the oxides or chlorides which were not fixed were removed by heating at 1200° C. for 1 hour. Quantitative analysis of the alkali metals shows that the trapping agent contains equimolar amounts of Cs and Rb and therefore that it has indeed trapped Cs. The Rb-doped trapping agent thus makes it possible to form stable compounds Cs—Rb—Si—Zr—O by reaction and caesium-rubidium exchange with the compounds Rb—Si—Zr—O. Equivalent results are obtained with potassium but the exchange kinetics are slower.

In order to test the stability of the compounds formed, compounds of the formula $Cs_xRb_{1-x}ZrSi_3O_{8.5}$ were heated at 1600° C. for a period of 5 hours and it was found that, with $x \geq 0.2$, the retention of caesium was improved in relation to compounds without Rb.

When the trapping agent is a constituted compound, it is generally prepared, prior to its use in the fuel element, by any known means (for example fusion, sintering, co-precipitation and calcining, etc . . . ).

The mixtures of oxides or the constituted compounds serving as a trapping agent are generally mixed in the powder condition with the powder of fuel oxide prior to pressing in the form of pellets and sintering. As regards the second and third variants, they may be applied to the surface of the pellet or to the interior of the sheath by any means known to the man skilled in the art, for example the application of a wash, hot spraying, etc . . . .

When the trapping agent is introduced into the pellet, care is taken to ensure that dispersion thereof in the fuel is highly intimate in order that the fission products can form the stable compound as soon as they appear, thus limiting migration thereof. For that purpose, the trapping agent is introduced into the fuel oxide powder prior to shaping and sintering in the form of very fine powder.

The amount of trapping agent used is generally between 0.3% and 5% (by weight) with respect to the weight of fuel contained in the fuel element and preferably between 0.5% and 2% for example for PWR reactors.

In all the variants of use of the trapping agents, it will be appreciated that the amount of the trapping agent used is compatible with the neutronic characteristics that the final fuel element must have.

In all cases, the fission products are trapped in the course of normal operation of the reactor by forming with the trapping agent oxygenated compounds which are stable at high temperature (including in a molten medium), and which are more or less complex; in particular they give lines, by X-ray examination, which are unknown in the indexes, that being the case in particular with the compound $CsZrSi_3O_{8.5}$ referred to above.

Thus, in accordance with the invention, the solid fission products are trapped in the form of a chemical compound which is formed in situ and which is stable at very high temperature (higher than 1600° C. or, better, higher than 1800° C. and even in a molten medium), which affords a low level of volatility, and which is compatible with the neutron aspect of the reactor; in addition the trapping agent is effective to trap the fission products at the operating temperature of the reactor, it has a melting temperature which is compatible with the temperature for sintering of the uraniferous fuel pellet, it is stable in relation to the uraniferous fuel and it presents only a small dimensional variation when trapping occurs.

We claim:

1. A nuclear fuel element comprising sintered pellets based on uraniferous oxide and a metal sheath surrounding said pellets, the pellets comprising a trapping agent based on mixed metallic oxides comprising $SiO_2$ and one at least of the oxides $ZrO_2$ or $CeO_2$, said trapping agent being capable of trapping fission products which appear in the course of irradiation of said fuel element by formation of a compound with said fission products in situ during irradiation, said compound being stable at a temperature of at least 1600° C.

2. A nuclear fuel element comprising sintered pellets based on uraniferous oxide and a metal sheath surrounding said pellets, the pellets being coated with a trapping agent based on mixed metallic oxides comprising $SiO_2$ and one at least of the oxides $ZrO_2$ or $CeO_2$, said trapping agent being capable of trapping fission products which appear in the course of irradiation of said fuel element by formation of a compound with said fission products in situ during irradiation, said compound being stable at a temperature of at least 1600° C.

3. A nuclear fuel element comprising sintered pellets based on uraniferous oxide and a metal sheath surrounding said pellets, the sheath being internally coated with a trapping agent based on mixed metallic oxides comprising $SiO_2$ and one at least of the oxides $ZrO_2$ or $CeO_2$, said trapping agent being capable of trapping fission products which appear in the course of irradiation of said fuel element by formation of a compound with said fission products in situ during irradiation, said compound being stable at a temperature of at least 1600° C.

4. An fuel element according to any one of claims 1 to 3 characterised in that the oxides are used in the form of a mixture or a constituted compound.

5. A fuel element according to any one of claims 1 to 3 wherein the trapping agent also contains $TiO_2$ or $Nb_2O_5$.

6. A fuel element according to any one of claims 1 to 3 wherein the trapping agent also contains at least one stable oxygenated compound of alkali or alkaline-earth metal, 7. A fuel element according to any one of claims 1 to 3 wherein the trapping agent represents from 0.3% to 5% of the weight of fuel.

8. A fuel element according to any one of claims 1 to 3 wherein Si and Zr are present in the trapping agent in a molar ratio of between 2:1 and 3:1.

9. A fuel element according to any one of claims 1 to 3 wherein, in the case of trapping Cs by a silico-zirconate, the Cs and Zr are present in a molar ratio lower than 1:1.

10. A fuel element according to claim 1 wherein the trapping agent and its possible additives are added in the form of very fine powder to the powder of fuel oxide to produce a highly intimate mixture which is then shaped and sintered to obtain the fuel pellet.

11. A fuel element according to claim 10 wherein the trapping agent comprises a plurality of constituents which are melted, homogenised, solidified, reduced to the state of very fine powder and then mixed with the powder of fuel oxide before shaping and sintering to obtain the fuel pellet.

12. A fuel element according to claim 7, wherein the trapping agent comprises 0.5 to 1% by weight of the fuel.

13. A fuel element according to claim 6, wherein the trapping agent contains MgO.

* * * * *